Sept. 29, 1970 N. W. BELL 3,531,584

COLOR VIDEO CAMERA AND IMAGE RECORDING SYSTEMS
UTILIZING STRIPED FILTERS

Filed Oct. 10, 1967 5 Sheets-Sheet 1

INVENTOR.
NORTON W. BELL
BY Raymond A. Andrews
ATTORNEY.

INVENTOR.
NORTON W. BELL
BY
Raymond A. Anderson
ATTORNEY.

Sept. 29, 1970 N. W. BELL 3,531,584

COLOR VIDEO CAMERA AND IMAGE RECORDING SYSTEMS
UTILIZING STRIPED FILTERS

Filed Oct. 10, 1967 5 Sheets-Sheet 3

INVENTOR.
NORTON W. BELL
BY Raymond A. Anselm
ATTORNEY

INVENTOR.
NORTON W. BELL
BY Raymond C. Andersen
ATTORNEY.

Sept. 29, 1970 N. W. BELL 3,531,584
COLOR VIDEO CAMERA AND IMAGE RECORDING SYSTEMS UTILIZING STRIPED FILTERS
Filed Oct. 10, 1967 5 Sheets-Sheet 5

INVENTOR.
NORTON W. BELL
BY Raymond A. Andrews
ATTORNEY.

United States Patent Office 3,531,584
Patented Sept. 29, 1970

3,531,584

COLOR VIDEO CAMERA AND IMAGE RECORDING SYSTEMS UTILIZING STRIPED FILTERS

Norton W. Bell, Pasadena, Calif., assignor to Bell & Howell Company, Chicago, Ill., a corporation of Illinois Filed Oct. 10, 1967, Ser. No. 674,171
Int. Cl. H04n 9/06
U.S. Cl. 178—5.4 41 Claims

ABSTRACT OF THE DISCLOSURE

Apparatus for producing electrical signals indicative of a predetermined color content of a colored image, comprising means for producing a waveform composed of alternating first components representing light impressions within a first spectral range and second components representing light impression within a second spectral range, means for producing first and second signals being respectively proportional to the difference and to the sum of the mentioned first and second components, and means for combining these first and second signals in different senses to produce third and fourth signals being respectively proportional to the light impression within the mentioned first spectral range and to the light impression within the mentioned second spectral range; and apparatus which exploit these principles to provide tricolor video signals and to permit the recording of color video scenes on monochromatic media.

BACKGROUND OF THE INVENTION

Field of the invention

The subject invention relates to color video systems and, more particularly, to apparatus for producing color video signals, and apparatus for recording color video scenes and for reproducing recorded color video scenes.

Description of the Prior Art

The most widely used type of color television camera uses three image pickup tubes for the primary colors red, blue and green. Some high-quality systems employ a fourth camera tube for the luminance channel.

A more recently developed color television camera system follows a similar principle by providing a tricolor camera tube for the chrominance channel and a monochromatic tube for the luminance channel. The tricolor camera tube receives the color scene to be transmitted through an optical filter composed of recurring stripe sections. Each stripe section includes essentially a red, a blue, and a green filter stripe, so that signals corresponding to the three primary colors can be provided by one camera tube.

In this manner, tricolor operation is possible with only two camera tubes. While this is highly advantageous in many applications, certain requirements still render this type of camera system rather complex.

For instance, provisions have to be made for components which enable the chrominance channel to distinguish between the different color signals brought about by the red, blue and green stripes in each of the many recurring filter sections. To this end, it is necessary to include in each filter section an indexing stripe. This not only consumes essential filter space, but also introduces a large number of recurring discontinuities in the scanning of the color scene. In addition, special means have to be provided to enable the chrominance channel to distinguish between the color indexing signals thus produced on the one hand, and actual video signals on the other. If one considers the large variety of scenes and scene compositions processed by video cameras, the high probability that scene elements may bring forth video signals that are closely similar to the mentioned color indexing signals becomes readily apparent.

Moreover, the use of the above mentioned tricolor filter stripe sections provides all three color signals in sequence. This requires the provision of special means for aligning the three color signals for each filter section so that they appear simultaneously, if the chrominance channel, as is usually the case, is designed to operate with simultaneous color signals.

All this introduces special problems and resulting circuit complexities which are opposed to the widespread desire of making color video camera equipment available at feasible cost to such entities as private individuals, families and educational institutions.

A significantly simplified two-camera system produces color signals by employing at one camera a color neutral light filter and at the other camera a light filter the density of which is a function of color (e.g., density=0.2 for blue light, 0.5 for green light, and 0.8 for red light). There exists, however, still a need for a simplified color camera system that readily provides luminance and chrominance signals of a conventional type.

Another class of prior-art systems operates on the basis of an assignment of a specific frequency to each color signal.

According to one such system, color scenes are picked up by a camera tube through an optical filter composed of repetitive filter stripe patterns. Each pattern includes a first filter stripe designed to pass light of a first color, a second filter stripe designed to pass light of a second color, and a third filter stripe designed to pass light of a third color. The first filter stripe, which may be designed to pass green light, is as wide as the second and third filter stripes together. In this manner, chrominance signals are produced which are distinguished from each other by particular signal frequencies. The primary disadvantage of this prior-art system is that it still requires means, such as the above mentioned indexing stripes or other auxiliary equipment, for producing a color-reference signal. Also the circuitry for extracting from the camera output the different color signals on the basis of their frequencies is rather complex.

According to another system of the class under consideration, specific frequencies are imposed on chrominance signals by the use of two optical filters at the camera tube. Both of these filters are composed of clear and colored stripes which alternate with each other. The stripes in one of the filters are narrower than the stripes in the other filter, so that chrominance signals for different colors will have different frequencies.

Again the circuitry for extracting the different color signals from the camera output is rather complex, inasmuch as harmful error terms arising from the operation of the system have to be eliminated by special means.

In the area of color video recording, it has been recognized that considerable expense and film processing are involved in the recording of color programs on color film. These and other known drawbacks of this kind of recording medium have prompted an intensified development of magnetic video tape recorders. Unfortunately, available types of such recording machines are still too complex and expensive for many uses.

Proposals have thus been advanced to use relatively inexpensive black-and-white film for color video recording purposes.

One such proposal employs the above mentioned neutral and color-variable density filters to produce color recordings on panchromatic film. While this proposal is very advantageous for its simplicity, a need still exists for a color recording system which readily provides on playback luminance and chrominance signals of a conventional type, such as the luminance and chrominance signals occurring in the familiar NTSC color video system.

Other prior-art proposals record color video programs on panchromatic film by using a separate frame or field on the film for each chrominance component, in addition to one or more frames or fields used for the accompanying luminance component of the photographed scene. The result of such a procedure naturally is a considerable consumption of film.

SUMMARY OF THE INVENTION

The present invention overcomes the above mentioned disadvantages and provides simplified color camera and color image recording apparatus.

The apparatus according to a broad aspect of the invention is characterized by means for producing a waveform composed of alternating first and second components. The first components represent light impressions within a first spectral range received from the image being picked up, while the second components represent light impressions from the image within a second spectral range. The second spectral range may be included in the first spectral range, or the first and second spectral ranges may be so related that the mentioned first components are of higher magnitude than the mentioned second components.

The apparatus further includes means for producing a first signal substantially proportional to a first combination of the mentioned first and second components, and a second signal substantially proportional to a second combination of these components; as well as means for combining the mentioned first and second signals in a first sense to provide a third signal proportional to the above mentioned light impressions within the first spectral range, and for combining these first and second signals in a second sense to provide a fourth signal proportional to the named light impressions within the second spectral range.

As this description proceeds, it will be appreciated that this system produces color signals, or luminance and chrominance signals, without the need for the specialized color stripe synchronization procedure and equipment of the type mentioned above and without an assignment of different signal frequencies to different colors.

It will also be noted that the above mentioned means for producing a first signal substantially proportional to a first combination of the mentioned first and second components and a second signal substantially proportional to a second combination of these components operate in the preferred embodiments specifically disclosed herein to provide a first signal substantially proportional to the difference between the two components and a second signal substantially proportional to the sum of these two components.

The invention also employs its basic principle for recording colored images on relatively inexpensive media, for subsequent playback of the color scenes.

One apparatus for this recording purpose includes first means for resolving the image into a plurality of first image areas, and into a plurality of second image areas alternating with the first image areas; with the first pattern areas being composed of light impressions from the image substantially within a first spectral range, and the second pattern areas being composed of light impressions from the image substantially within a second spectral range, and second means for recording said alternating first and second image areas in an image frame on a recording medium, and third means for recording on the medium light impressions from the image substantially within at least one further spectral range which is different from the mentioned first and second spectral ranges.

Upon playback, the recorded impressions are sensed for the production of corresponding color signals, or luminance and chrominance signals.

In this manner, an inexpensive recording medium, such as panchromatic film, can be used to record color scenes.

BRIEF DESCRIPTION OF THE DRAWINGS

Various aspects of the invention are illustrated by way of example in the accompanying drawings, in which.

DESCRIPTION OF THE PREFERRED EMBODIMENTS

Figure 1:
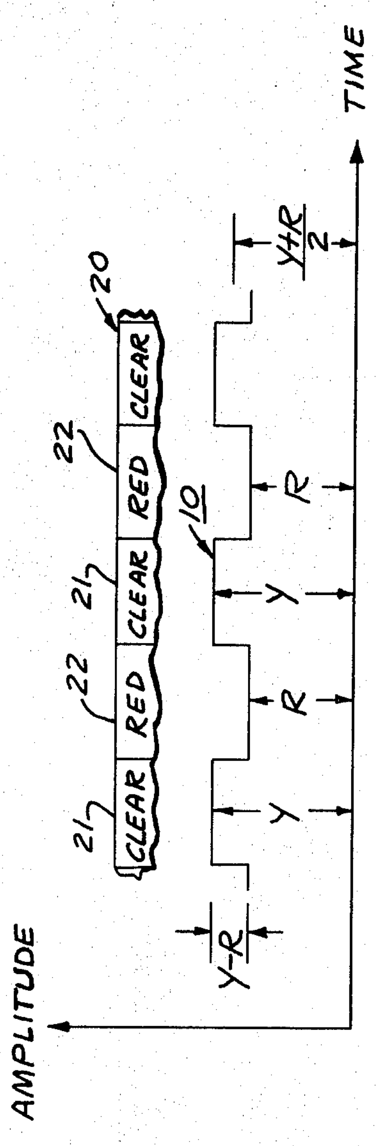
FIG. 1 illustrates an optical filter section and a waveform produced with the aid of such filter section in accordance with the invention.
Figure 2:
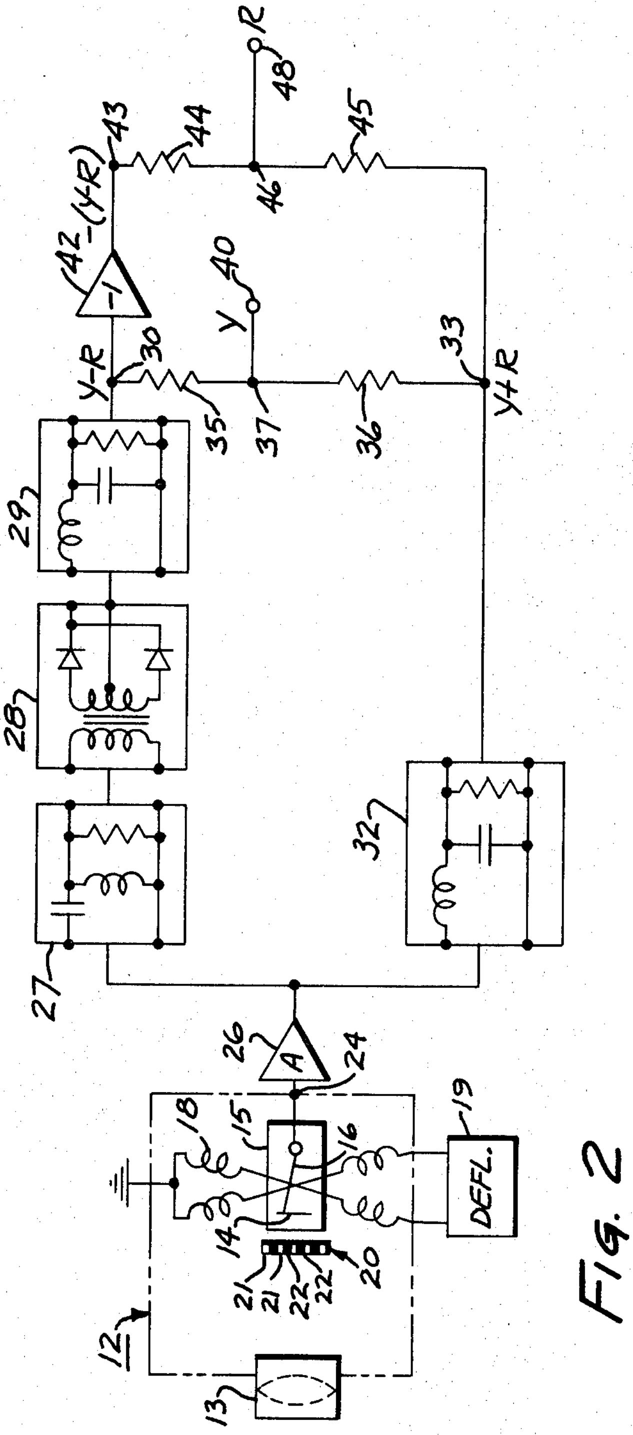
FIG. 2 is a block diagram of a color camera apparatus in accordance with a first preferred embodiment of the invention.

The waveform 10 in the amplitude versus time plot of FIG. 1 represents an electric signal produced by the video camera 12 illustrated in FIG. 2.

The camera 12 includes an objective 13 for projecting colored images or scenes onto the photosensitive target 14 of a camera tube 15 which may be of a conventional type in which the target is scanned by an electron beam 16 for the generation of electric signals which, point for point, correspond to the light impressions received on the target 14. For details of the camera tube and its general operation, reference is made to Martin, Technical Television (Prentice-Hall 1962) (hereinafter referred to as Martin), pp. 3 to 6, and 34 to 45. For example, the camera tube 15 may be a Vidicon (see Martin pp. 42 to 44). Conventional horizontal and vertical scanning equipment is indicated in FIG. 2 at 18 and 19, but is not again shown in the subsequent figures. It is understood that the embodiments illustrated herein may employ conventional types of synchronization equipment, such as is customarily used in television systems to assure a proper horizontal and vertical image display (see Martin pp. 21 to 23 and passim). This synchronization equipment is not part of the subject invention and is thus not illustrated in the drawings. It is, however, understood that conventional synchronization signals (e.g., horizontal sync and vertical sync) may be incorporated in the luminance signal in accordance with standard practice.

Reverting to the camera 12 of FIG. 2, it will be noted that this camera includes an optical filter 20 ahead of the camera tube target 14. This filter is composed of alternating first and second filter stripes 21 and 22. The first stripes 21 are designed to transmit luminosity impressions from the image being picked up. The stripes 21 may have a predetermined coloring, such as yellow-green tint, which matches the luminosity curve of the average human eye. Where an approximation works satisfactorily, the stripes 21 may be optically clear. Stripes of the latter types as well as stripes of the former, yellow-green tinted type are broadly designated herein as "clear" or "neutral" stripes.

The second stripes 22 are color filter stripes. In the embodiment of FIG. 2, the stripes 22 are assumed to transmit light from the red portions of the visual spectrum from the image being picked up. As the electron beam 16 sweeps along a horizontal line across the target 14, a waveform is produced at the camera tube output 24 which generally corresponds to the waveform 10 shown in FIG. 1 when viewing an object reflecting some red light.

As indicated in FIG. 1, this waveform is composed of alternating luminance components Y and color components R corresponding to the respective spectral light ranges passed by the clear and the red filter stripes 21 and 22 of the filter 20. To clarify the nature of the waveform 10, a section of the filter 20 is shown in FIG. 1. In practice, each of the filter stripes 21 and 22 may extend so as to cover in its optical projection the vertical dimension of the target 14. The stripes 21 and 22 may then alternate with each other along the horizontal dimension of the target 14, as shown in FIG. 2. In the illustrated embodiments, the clear and colored filter stripes 21 and 22 are of equal widths. For increased color fidelity, the width of each filter stripe should be somewhat less than the resolution of the lens 13.

The waveform produced at the camera tube output 24 is amplified at 26 and thereafter applied to a high-pass filter 27. An envelope detector 28 detects the envelope of the signal passed by the high-pass filter 27, and a low-pass filter 29 serves to remove high-frequency components from the envelope detected by the detector 28. The filters 27 and 29 and the detector 28 may be conventional components which operate in a conventional manner as a means for producing at a terminal 30 a signal $Y-R$ which, as indicated in FIG. 1, is proportional to the difference between a luminance component Y and a color component R of the waveform 10. As the electron beam 16 performs its scanning operation, the components 27, 28 and 29 produce the $Y-R$ signal so that this signal varies as a function of the instantaneous differences between the Y and R components of the waveform 10.

The waveform 10, after amplification at 26, is also applied to a low-pass filter 32 which operates as a means for producing at a terminal 33 a signal which, as indicated in FIG. 1, is proportional to the instantaneous sums of the Y and R components of the waveform 10.

A pair of series-connected matrixing resistors 35 and 36 is connected between the terminals 30 and 33. The resistor 35 is designed to apply a signal equal to $\frac{1}{2}(Y-R)$ to a summing point 37. The resistor 36 is designed to apply a signal equal to $\frac{1}{2}(Y+R)$ to the summing point 37. At this summing point 37, the two signals just mentioned are added to one another, so that the $\frac{1}{2}$Y component of one of these signals is added to the $\frac{1}{2}$Y component of the other of these signals, whereupon a resulting luminance signal Y appears at the output terminal 40. At the same time, the $+\frac{1}{2}$R component of the signal derived from the terminal 33 is cancelled at the summing point 37 by the $-\frac{1}{2}$R component of the signal derived from the terminal 30, so that the Y signal at the output 40 varies as a function of the luminance of the scene elements picked up by the camera 12.

An inverting amplifier 42 of a gain of one is connected to the terminal 30 to provide at a terminal 43 a signal equal to $-(Y-R)$, which amounts to $R-Y$. A pair of series-connected matrixing resistors 44 and 45 is connected between the terminals 33 and 43. The resistor 44 operates to apply a signal equal to $\frac{1}{2}(R-Y)$ to a summing point 46, while the resistor 45 operates to apply a signal equal to $\frac{1}{2}(Y+R)$ to this summing point. The components $-\frac{1}{2}$Y and +Y of these signals cancel each other at the summing point 46, while the signal components $\frac{1}{2}$R from one of these signals and $\frac{1}{2}$R from the other of these signals combine to form a signal R which appears at the output terminal 48 and which varies as a function of the red light from the scene elements picked up by the camera 12.

In this manner, a luminance and an accompanying primary color signal are produced by relatively simple means in a simple fashion. If desired, the colored stripes 22 of the filter 20 can be designed to pass, for example, blue color components whereupon a blue color signal appears at the output 48. A green color component may be produced at the output 48 by designing the filter stripes 22 to pass green color components of the scene being picked up by the camera 12.

It may be noted at this juncture that the apparatus of FIG. 2 embraces an important principle of the preferred embodiments of the invention disclosed herein. In terms of the waveform 10 shown in FIG. 1, this principle manifests itself by the fact that any given image element picked up by the camera 12 will result in a luminance or Y component of the waveform 10 that has a higher amplitude than the accompanying color or R component. Accordingly, synchronization or indexing of the detector means 28 is not necessary, since the difference signal at the terminal 33 will always be equal to luminance minus color $(Y-R)$, rather than being ambiguously $(Y-R)$ or $(R-Y)$.

In FIG. 2, this is accomplished by having neutral filter stripes 21 alternate with the color-transmissive filter stripes 22, so that the light impressions passed by the stripes 21 will always be of higher magnitude than the light impressions passed by adjacent stripes 22. Accordingly, it can be generally stated that the stripes 21 pass light impressions within a first spectral range and the stripes 22 pass light impressions within a second spectral range, with the second spectral range (color) being included in the first spectral range (luminance). Alternatively, it can also be stated that the first and second spectral ranges just mentioned are so interrelated that first components (e.g., the Y components) of the waveform 10 are of higher magnitude than second components (e.g., the R components) of that waveform.

Figure 3:
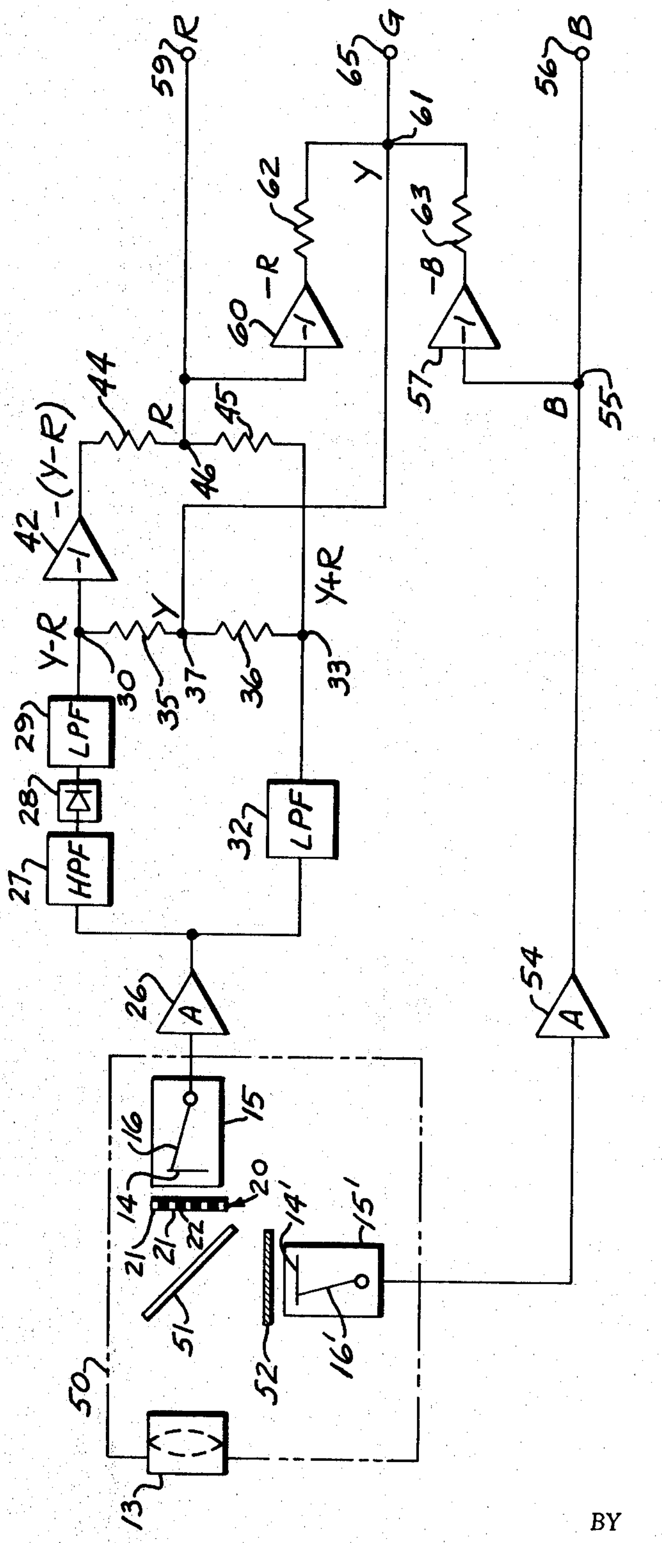
FIG. 3 is a block diagram of a color camera system in accordance with a second preferred embodiment of the invention.

An apparatus which produces primary color signals R, G and B (red, green and blue) from a color scene is illustrated in FIG. 3.

The embodiment of FIG. 3 has a color video camera 50 which includes the above mentioned objective 13, the light filter 20 with clear or neutral filter stripes 21 and red filter stripes 22, and the camera tube 15. A beam splitter 51, which may be a dichroic mirror arrangement, applies the same light pattern picked up by the objective 13 to the filter 20 for transmittal to the camera tube target 14, and also to a filter 52 to be more fully described below.

The apparatus between the light filter 20 and the summing points 37 and 46 is the same as the one shown in FIG. 2. The function of this apparatus is also the same as of the one illustrated in FIG. 2, so that the above mentioned luminance signal Y and color signal R appear, respectively, at the summing points 37 and 46 as hereinbefore described.

The light filter 52 is designed to transmit blue color components of the scene picked up by the camera 50. These blue color components are applied to the target 14' of a camera tube 15' which may be of the same design as the camera tube 15. The target 14' is swept by an electron beam 16'. The electron beams 16 and 16' are swept in mutual synchronism so that they impinge on corresponding points of their respective targets 14 and 14'. This may be done with the type of equipment generally indicated at 18 and 19 in FIG. 2.

The output of the camera tube 15' is amplified at 54. Because of the transmission characteristic of the filter 52, a chrominance signal B corresponding to the blue color component of the scene picked up by the camera 50 appears at a terminal 55 connected to the output of the amplifier 54. The blue chrominance signal B is applied to an output terminal 56 and also to an inverting amplifier 57 of a gain of one.

Similarly, the red color signal R at terminal 46 is applied to an output terminal 59 and an inverting amplifier 60 of a gain of one. The luminance signal Y at the terminal 37 is applied to a summing point 61 where it is combined with the −R signal provided by the amplifier 60 through a matrixing resistor 62 and the −B signal provided by the amplifier 57 through a matrixing resistor 63. A color signal G which corresponds to the green color component of the scene picked up by the camera 50 is thus produced. If standard color filters are used, the matrix resistors may be chosen by use of the relation below that which is used in the U.S. (NTSC) color television system $$Y=0.3R+0.59G+0.11B$$

It will now be recognized that the apparatus of FIG. 3 is capable of providing three primary color signals with the aid of only two vidicons. In addition, this apparatus also provides a monochrome or luminance signal Y, which may be derived from the terminal 37. As is well known in the art, these color and luminance signals are used in video display equipment to display color video pictures, such as by means of a tricolor cathode ray tube or kinescope. Various other uses of these signals in color television equipment and color video tape recorders are also known.

Those skilled in the art will also recognize that the specific colors named above are given by way of example to explain the general concepts taught herein.

In some applications it may be advantageous to substitute in the system shown in FIG. 3 an apparatus of the type depicted in FIG. 2 for the components 52, 15' and 54. The result of such a modification is illustrated in FIG. 4 where unprimed reference numerals are used to designate components shown in FIG. 3, while primed reference numerals designate components illustrated in FIG. 2.

Figure 4:
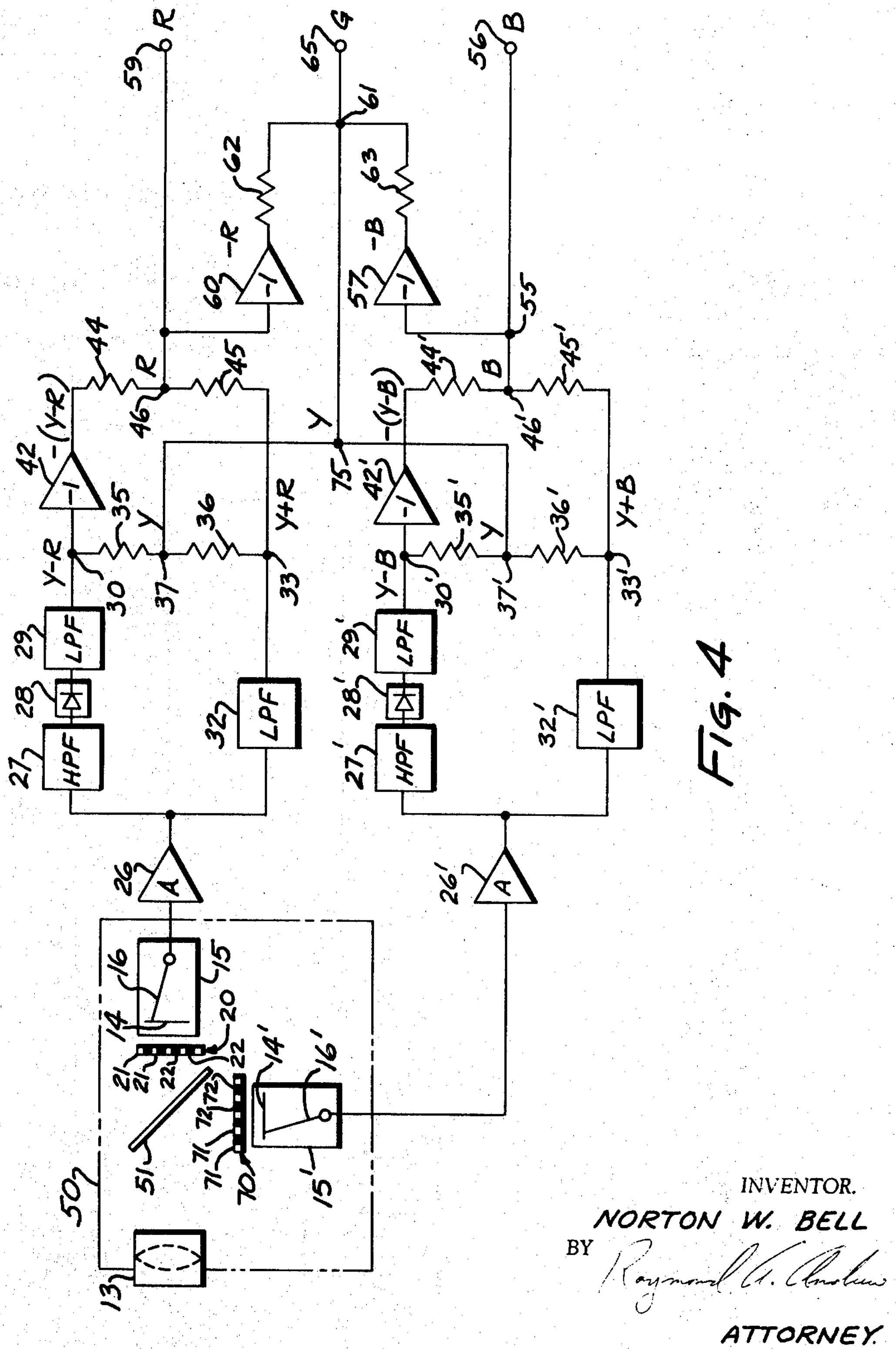
FIG. 4 is a block diagram of a color camera system in accordance with a third preferred embodiment of the invention.

Given the above descriptions of FIGS. 2 and 3, the operation of the system of FIG. 4 is easy to understand. The presence of the alternating clear and red-transmissive filter stripes 21 and 22 of the filter 20 brings about the provision of the luminance signal Y and the color signal R at the terminals 37 and 46, respectively.

A filter 70 composed of alternating clear and blue-transmissive filter stripes 71 and 72 is used in FIG. 4 ahead of the camera tube target 14'. For the reasons outlined above in connection with FIG. 2, a signal of $Y-B$ (luminance minus blue) thereupon appears at the terminal 30', while a signal of $Y+B$ occurs at the terminal 33', the red component R shown in FIG. 2 being replaced by the blue component B stemming from the blue-transmissive filter stripes 72. Upon matrixing by the resistors 35' and 36', a luminance signal Y appears at the summing point 37'. The luminance signals from the summing points 37 and 37' are combined at a summing point 75.

The blue color signal B is produced in FIG. 4 at the summing point 46' in the same manner as the red color signal R is produced at the summing point 46 in FIG. 2. The green color signal G is extracted from the signals Y, R and B in the manner already explained in connection with FIG. 3.

The system according to FIG. 4 has the advantage that both camera tubes 15 and 15' are engaged in the production of the luminance signal. This improves the quality of the color scene display, since random noise in the signal at terminal 37 does not in general coincide with random noise in the signal at terminal 37', and since a high quality of the luminance signal is important in view of the fact that details of a color scene are primarily seen by the human eye monochromatically. Improvement of the Y signal also improves the signal-to-noise ratio of the green signal G. This also enhances the quality of the color scene display, since the human eye is more sensitive to details in green than in red or blue light.

Since most color television receivers are capable of displaying color scenes in response to a luminance signal Y and the two familiar color-difference signals $R-Y$ and $B-Y$, it is of advantage to have a camera system which produces these signals. Such a system is illustrated in FIG. 5.

Figure 5:
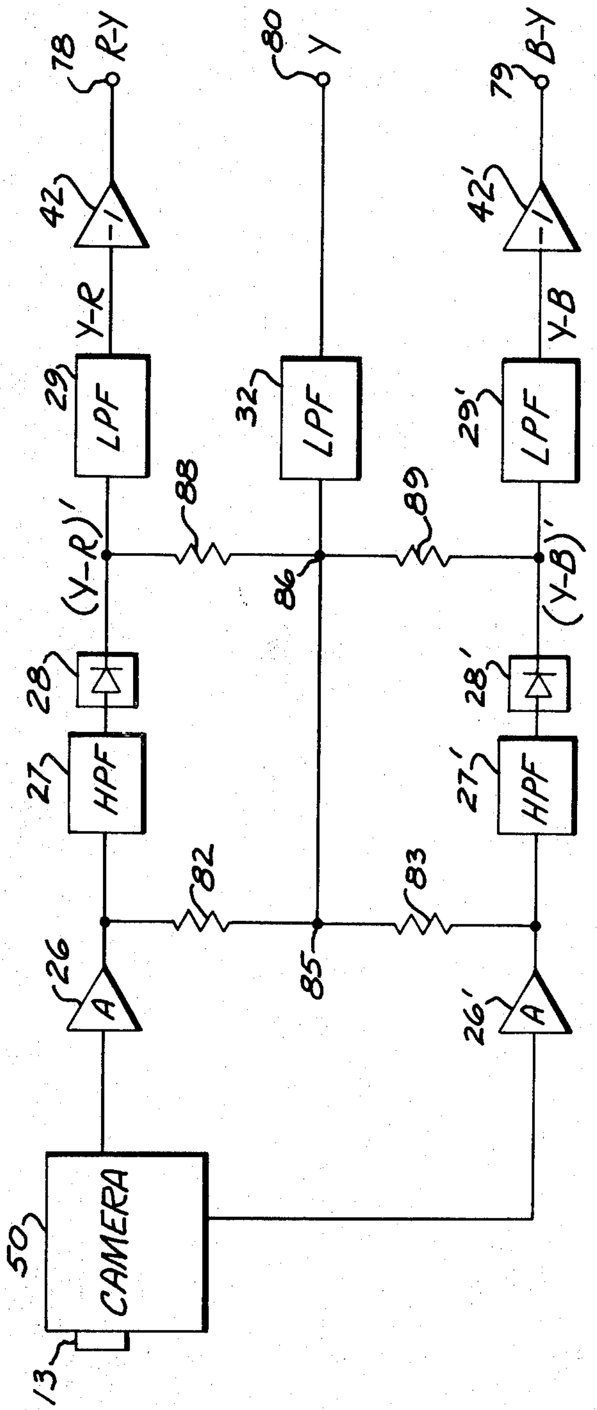
FIG. 5 is a block diagram of a color camera system in accordance with a fourth preferred embodiment of the invention.

The apparatus of FIG. 5 has the same color camera 50 as the apparatus of FIG. 4. Other like components include the amplifiers 26 and 26', the high-pass filters 27 and 27', the envelope detectors 28 and 28', the low-pass filters 29 and 29', the low-pass filter 32, and the inverting amplifiers 42 and 42'.

As in FIGS. 2, 3 and 4, the components 27, 28 and 29 operate to produce a signal of $Y-R$ from the amplified output of the camera tube 15 having the clear and red stripe filter 20 associated therewith. This $Y-R$ signal is inverted by the inverter 42 and is thereupon applied to the output terminal 78 as the color-difference signal $R-Y$.

As in FIG. 4, the components 27', 28' and 29' operate to produce a signal of $Y-B$ from the amplified output of the camera tube 15' having the clear and blue stripe filter 70 asociated therewith. This $Y-B$ signal is inverted at 42' so that the color-difference signal $B-Y$ appears at the output terminal 79.

To provide the luminance signal Y at the output terminal 80, only one low-pass filter is used in the circuit of FIG. 5. This is the filter 32 already discussed above in connection with FIG. 2.

In FIG. 5, a pair of resistors 82 and 83 matrix the amplified outputs of the camera tubes 15 and 15'. Since each tube is subjected to a different color component of the scene, but to the same monochromatic luminance impression, the luminance component of the combined waveform at the summing point 85 is more prominent than the combined color components. The point 85 is connected to the summing point 86. This point 86 receives the combined waveform just mentioned, as well as a signal corresponding to the sum of the unfiltered detector outputs $(Y-R)'$, and $(Y-B)'$ matrixed by the resistors 88 and 89.

Ideally, the matrixing operation of the resistors 82 and 83 results in a waveform including luminance and color components in the proportion of Y, ½R, and ½B. The matrixing operation of the resistors 88 and 89 results in a signal of $Y-\frac{1}{2}R-\frac{1}{2}B$. The former waveform and the latter signal are combined at the summing point 86 and the low-pass filter 32 operates to extract the luminance component Y from this combination and to apply such extracted component to the output terminal 80.

It will be recognized that the $Y-R$ and $Y-B$ color-difference signals are also provided by the inverters 42 and 42' of the system of FIG. 4. However, the circuit of FIG. 5 has the advantage that the low-pass filter 32' shown in FIG. 4 is dispensed with, since filtering in the Y channel may be effected after the resistive matrixing.

While the system of FIG. 5 is useful for driving conventional color television receiver circuits, it may also be employed as a means for making color scenes suitable for recording on a video tape recorder or other equipment adapted to operate in response to Y, $R-Y$, and $B-Y$ signals. It is understood that the signals provided by the other circuits shown herein may also be recorded on magnetic tape or the like.

Figure 6:
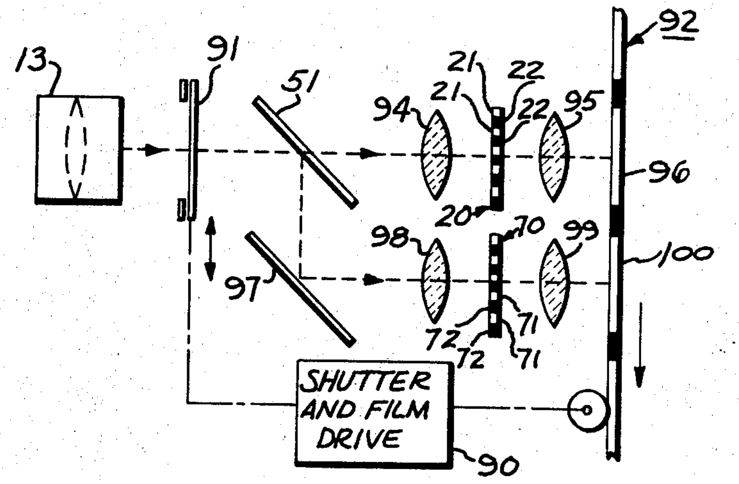
FIG. 6 is a diagrammatic illustration of a color image recording system in accordance with a preferred embodiment of a further aspect of the invention.
Figure 7:
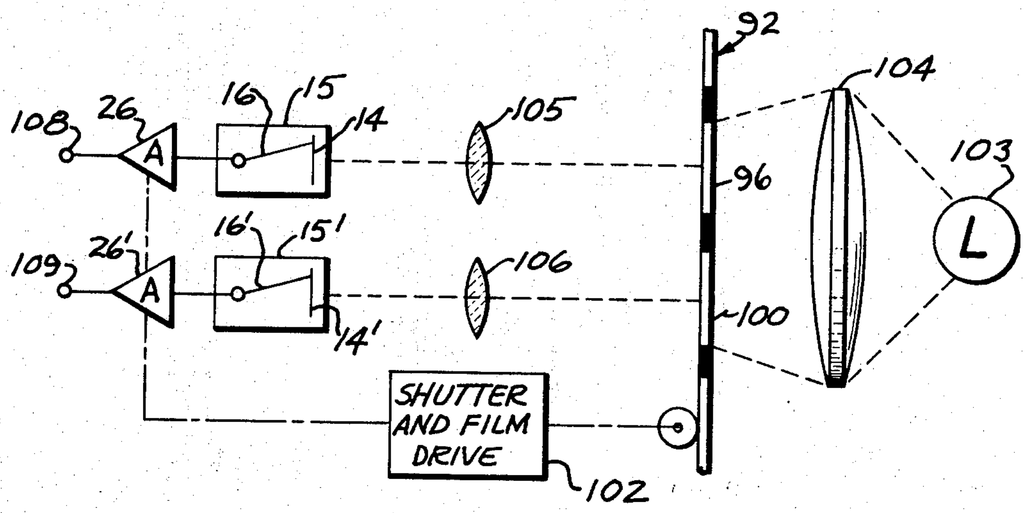
FIG. 7 is a diagrammatic illustration of essential parts of a system according to the invention for reproducing color images which were recorded by the system of FIG. 6.

Alternative recording methods and apparatus according to the subject invention are illustrated in FIGS. 6 and 7. In connection with these figures it may be helpful to consider the basic approach of the methods illustrated thereby as an interposition of a panchromatic filming process between the stripe filter 20 and the camera tube 15 and between the stripe filter 70 and the camera tube 15' of the apparatus of FIG. 4.

Accordingly, like elements as among FIGS. 4, 6 and 7 are designated by like reference numerals.

The recording apparatus of FIG. 6 includes a conventional shutter and film drive 90 which, as its name implies, actuates a shutter 91 and drives a film 92. In the illustrated embodiment, the film 92 is a panchromatic photographic film and is intermittently advanced at a rate at which the images to be recorded are intended to be played back. If the recorded images are to be displayed by equipment performing under the NTSC Standard, the film 92 is intermittently advanced at a rate of 30 advances per second and the shutter 91 is opened a like number of times per second.

The color scene picked up by the objective 13 while the shutter 91 is open passes through the beam splitter 51 and is imaged on the filter 20 by a field lens 94. The clear filter stripes 21 pass luminance components of the scene, while the red-transmissive filter stripes 22 pass red color components. The resulting clear and red stripe pattern is photographed by means of a relay lens 95 on a frame 96 of the film 92.

The color scene picked up by the objective 13 is also reflected by the beam splitter 51 onto a one-way mirror 97 from where it is imaged on the filter 70 by a field lens 98. The clear filter stripes 71 again pass luminance components of the scene, while the blue-transmissive filter stripes 72 pass blue color components. The resulting clear and blue stripe pattern is photographed by means of a relay lens 99 on a frame 100 of the film 92. If desired, the two stripe patterns can be photographed side-by-side instead of one above the other as shown. In this case, the film 92 has to be wider, but need only be advanced by one-half the distance each time.

The filming process is continued in the sense just described for a desired period of time. The panchromatic film 92 is thereupon chemically developed in a conventional manner. The result is a photographic monochromatic recording of the filmed color scenes.

To display the recorded scenes, a playback apparatus of the type illustrated in FIG. 7 may be employed. This apparatus has a shutter and film drive 102 which drives the developed film 92 at the same rate as it was driven during recording in the apparatus of FIG. 6. A projector lamp 103 with a condenser lens 104 illuminates the frames 95 and 100.

A lens 105 images the monochromatic representation of the above mentioned clear and red stripe pattern from the film frame 96 onto the target 14 of the camera tube 15, while a lens 106 images the monochromatic representation of the above mentioned clear and blue stripe pattern from the film frame 100 onto the target 14' of the camera tube 15'.

The tube 15 applies a waveform of the type shown at 10 to the amplifier 26 while its electron beam 16 scans the target 14. At the same time, the tube 15' applies a similar Y and B waveform to the amplifier 26' while its electron beam 16' scans the target 14. In the illustrated embodiment, both amplifiers 26 and 26' are presumed to be of a type which interrupts its operation in response to control signals. The shutter and film drive 102 supplies these control signals so that the amplifiers 26 and 26' serve as electronic shutters. If the camera tubes 15 and 15' are vidicons or other types of camera tubes that display an image storage effect, the light source 103 is preferably a gas discharge lamp that is pulsed by the shutter and film drive 102, or a shutter is provided to obscure the light source 103 periodically, so that each image frame will be imaged on the particular camera tube target in a relatively stationary manner.

The output of the amplifier 26 is applied to a terminal 108 which is connected to the filters 27 and 32 of the apparatus shown in FIG. 4. Similarly, the output of the amplifier 26' is applied to a terminal 109 which is connected to the filters 27' and 32' of the apparatus of FIG. 4. This apparatus thereupon provides the R, G and B color signals and the Y luminance signal in the manner described above. These signals may be employed for a display of the recorded scenes by a tricolor kinescope.

It will be appreciated that the apparatus of FIGS. 6 and 7 permit the use of relatively inexpensive recording media for a recording of color scenes. The recording medium is very efficiently utilized, since only two frames need to be occupied for each color image.

Modifications of the apparatus of FIGS. 6 and 7 include the connection of the filter 27 and resistor 82 to the terminal 108 and of the filter 27' and resistor 83 to the terminal 109 for the production of Y, $R-Y$, and $B-Y$ signals in the manner shown in FIG. 5. Moreover, the filter 52 shown in FIG. 3 may be substituted for the filter 70 illustrated in FIG. 6. In this case, the terminal 108 of the apparatus of FIG. 7 is connected to the filters 27 and 32 of the circuit shown in FIG. 3, while the terminal 109 is connected to the terminal 55 in FIG. 3. Under this modification, an image corresponding to one color impression is recorded on the film frame 100, while the previously mentioned clear and color stripe pattern is recorded on the frame 95.

While specific embodiments have been disclosed herein, modifications within the scope and spirit of the invention are apparent or will suggest themselves to those skilled in the art.

I claim:

1. Apparatus for producing electrical signals indicative of a predetermined color content of a colored image, comprising:

(a) first means for producing a waveform composed of alternating first and second components, with said first components representing light impressions from said image substantially within a first spectral range, and said second components representing light impressions from said image substantially within a second spectral range;

(b) second means connected to said first means and responsive to said first and second components for producing a first signal substantially proportional to a first combination of said first and second components;

(c) third means connected to said first means and responsive to said first and second components for producing a second signal substantially proportional to a second combination of said first and second components; and (d) fourth means connected to said second and third means for combining said first and second signals in a first sense to provide a third signal proportional to said light impression within said first range, and for combining said first and second signals in a second sense to provide a fourth signal proportional to said light impression within said second range.

2. Apparatus as claimed in claim 1, wherein said second spectral range is included in said first spectral range.

3. Apparatus as claimed in claim 1, wherein said first and second spectral ranges are so related that said first components are of higher magnitude than said second components.

4. Apparatus as claimed in claim 1, wherein said first combination is the difference between said first and second components, and said second combination is the sum of said first and second components.

5. Apparatus as claimed in claim 1, including fifth means for producing a fifth signal proportional to a light impression from said image substantially within a third spectral range.

6. Apparatus as claimed in claim 1, wherein said first means include:

(a) optical filter means composed of a pattern of alternating first and second light-transmissive areas, with said first areas being designed to transmit light impressions from said image substantially within said first spectral range, and said second areas being designed to transmit light impressions from said image substantially within said second spectral range; and (b) photosensitive signal producing means associated with said optical filter means and adapted to be sequentially responsive to said light impressions within said first spectral range and said light impressions within said second spectral range for producing a waveform composed of said first and second components.

7. Apparatus as claimed in claim 6, wherein said second spectral range is included in said first spectral range.

8. Apparatus as claimed in claim 6, wherein first and second spectral ranges are so related that said first components are of higher magnitude than said second components.

9. Apparatus for producing a luminance signal and a color signal from a colored image, comprising:

(a) first means responsive to said image for producing a waveform composed of alternating first and second components with said first components representing a luminosity characteristic of said image, and said second components representing a predetermined color characteristic of said image;

(b) second means connected to said first means and responsive to said first and second components for producing a first signal proportional to the difference between said first and second components;

(c) third means connected to said first means and responsive to said first and second components for producing a second signal proportional to the sum of said first and second components; and (d) fourth means connected to said second and third means for combining said first and second signals in a first sense to provide a third signal proportional to said luminosity characteristic, and for combining said first and second signals in a second sense to provide a fourth signal proportional to said color characteristic, with said third and fourth signals occurring substantially simultaneously and being separate from each other.

10. Apparatus as claimed in claim 9, wherein said first means include:

(a) optical filter means composed of a pattern of alternating first and second light-transmissive areas, with said first areas being designed to transmit a luminosity impression of said image, and said second areas being designed to transmit a color impression corresponding to said predetermined color characteristic of said image; and (b) photosensitive signal producing means associated with said optical filter means and adapted to be sequentially responsive to said luminosity and said color impressions of said image for producing a waveform composed of said first and second components.

11. Apparatus as claimed in claim 9, wherein said second means include signal differentiating means.

12. Apparatus as claimed in claim 9, wherein said second means include high-pass filter means.

13. Apparatus as claimed in claim 9, wherein said third means include signal integrating means.

14. Apparatus as claimed in claim 9, wherein said third means include low-pass filter means.

15. Apparatus as claimed in claim 9, wherein said fourth means include:

(a) means for combining said first and second signals additively to provide said third signal; and (b) means for combining said first and second signals subtractively to provide said fourth signal substantially simultaneously with and separate from said third signal.

16. Apparatus for producing a luminance signal and two color-difference signals from a colored image, comprising:

(a) first means responsive to said image for producing a first waveform composed of alternating first and second components, with said first components representing a luminosity characteristic of said image, and said second components representing a first predetermined color characteristic of said image;

(b) second means responsive to said image for producing a second waveform composed of alternating first and second components, with said first component of said second waveform representing a luminosity charactistic of said image, and said second component of said second waveform representing a second predetermined color characteristic of said image;

(c) third means connected to said first means and responsive to said first and second components of said first waveform for producing a first color-difference signal proportional to the difference between said first and second components of said first waveform;

(d) fourth means connected to said second means and responsive to said first and second components of said second waveform for producing a second color-difference signal proportional to the difference between said first and second components of said second waveform, and (e) fifth means connected to said third and fourth means for producing a luminance signal corresponding to a luminosity characteristic of said image in response to signals derived from said third and fourth means.

17. Apparatus as claimed in claim 16, wherein said fifth means are also connected to said first and second means to be responsive to said first and second waveforms, as well as said signals derived from said third and fourth means.

18. Apparatus as claimed in claim 17 wherein said fifth means include matrixing means connected to said first and second means and to said third and fourth means, and low-pass filter means connected to said matrixing means.

19. Apparatus for producing a luminance signal and two color signals from a colored image, comprising:

(a) first means responsive to said image for producing a waveform composed of alternating first and second components, with said first components representing a luminosity characteristic of said image, and said second components representing a first predetermined color characteristic of said image;

(b) second means responsive to said image for producing a waveform composed of alternating first and second components, with said first components of said second waveform representing a luminosity characteristic of said image, and said second components of said second waveform representing a second predetermined color characteristic of said image;

(c) third means connected to said first means and responsive to said first and second components of said first waveform for producing a first color-difference signal proportional to the difference between said first and second components of said first waveform;

(d) fourth means connected to said first means and responsive to said first and second components of said first waveform for producing a signal proportional to the sum of said first and second components of said first waveform;

(e) fifth means connected to said second means and responsive to said first and second components of said second waveform for producing a second color-difference signal proportional to the difference between said first and second components of said second waveform;

(f) sixth means connected to said second means and responsive to said first and second components of said second waveform for producing a signal proportional to the sum of said first and second components of said second waveform;

(g) seventh means connected to said third and fourth means for subtractively combining said first color-difference signal and said proportional signal produced by said fourth means to provide a first chrominance signal;

(h) eighth means connected to said fifth and sixth means for subtractively combining said second color-difference signal and said proportional signal produced by said sixth means to provide a second chrominance signal; and (i) ninth means connected to said third and fourth means and to said fifth and sixth means for additively combining (1) said first color-difference signal and said proportional signal produced by said fourth means, and (2) said second color-difference signal and said proportional signal produced by said sixth means, to provide a luminance signal.

20. Apparatus as claimed in claim 19, including tenth means connected to said seventh, eighth and ninth means for producing a third color signal in response to said first and second color signals and said luminance signal.

21. Apparatus for producing at least three electrical signals defining luminosity and chromaticity contents of a color image, couprising:

(a) first optical filter means composed of an alternating pattern of repetitive first and second light-transmissive areas, with said first areas being designed to transmit a luminosity impression of said image, and said second areas being designed to transmit a first color impression of said image;

(b) second optical filter means composed of an alternating pattern of repetitive first and second light-transmissive areas, with said first areas of said second filter means being designed to transmit a luminosity impression of said image, and said second areas of said second filter means being designed to transmit a second color impression of said image;

(c) means for projecting said image through said first and second optical filter means;

(d) first photosensitive signal producing means associated with said first optical filter means and adapted to be alternatingly responsive to said luminosity and first color impressions transmitted by said first optical filter means to produce a waveform composed of alternating first and second components representing, respectively, said luminosity impression and said first color impression transmitted by said first optical filter means;

(e) second photosensitive signal producing means associated with said second optical filter means and adapted to be alternatingly responsive to said luminosity and second color impressions transmitted by said second optical filter means to produce a waveform composed of alternating first and second components representing, respectively, said luminosity impression and said first color impression transmitted by said second optical filter means, and (f) means for differentiating and for integrating said first and second waveforms and for combining results of such differentiation and integration to produce at least three electrical signals defining said luminosity and chromaticity contents.

22. Apparatus as claimed in claim 9, including fifth means responsive to said image for producing a fifth signal proportional to a second predetermined color characteristic of said image.

23. Apparatus as claimed in claim 22, including sixth means connected to said fourth and fifth means for producing a sixth signal proportional to a third predetermined color characteristic of said image in response to said third, fourth and fifth signals.

24. Apparatus as claimed in claim 22, wherein said fifth means include:

(a) optical filter means substantially uniformly designed to transmit a color impression corresponding to said third color characteristic; and (b) photosensitive signal producing means associated with said optical filter means and adapted to produce a signal proportional to said third color characteristic.

25. Apparatus for recording a colored image on a recording medium, comprising:

(a) first means for resolving said image into a plurality of first image areas, and into a plurality of second image areas alternating with said first image areas, with said first image areas being composed of light impressions from said image substantially within a first spectral range, and said second image areas being composed of light impressions from said image substantially within a second spectral range;

(b) second means operatively associated with said first means for recording said alternating first and second image areas in an image frame on said medium; and (c) third means for recording on said medium light impressions from said image substantially within at least one further spectral range different from said first and second spectral ranges.

26. Apparatus as claimed in claim 25, wherein said second spectral range is included in said first spectral range.

27. Apparatus as claimed in claim 25, wherein said first and second spectral ranges are so related that said light impressions within said first spectral range are of higher magnitude than said light impressions within said second spectral range.

28. Apparatus for recording a colored image on a recording medium, comprising:

(a) first means for recording on said medium a first image pattern composed of repeatedly alternating first and second pattern areas, with said first pattern areas being composed of light impressions from said image substantially within a first spectral range, and said second pattern areas being composed of light impressions from said image substantially within a second spectral range; and (b) second means for recording on said medium a second image pattern composed of repeatedly alternating third and fourth pattern areas, with said third pattern areas of said second image pattern being composed of light impressions from said image substantially within said first spectral range, and said fourth pattern areas of said second image pattern being composed of light impressions from said image substantially within a third spectral range different from said first and second spectral ranges.

29. Apparatus as claimed in claim 28, wherein said third spectral range is included in said first spectral range.

30. Apparatus as claimed in claim 28, wherein said first spectral range and said third spectral range are so related that said light impressions within said first spectral range are of higher magnitude than said light impressions within said third spectral range.

31. Apparatus as claimed in claim 25, wherein said first image areas are composed of luminance impressions from said image, and wherein said second spectral range encompasses a first color impression and said further spectral range encompasses a second color impression from said image.

32. Apparatus as claimed in claim 25, wherein said first means include optical filter means composed of repeatedly alternating first and second light-transmissive areas, with said first light-transmissive areas being designed to transmit light impressions from said image within said first spectral range, and said second light-transmissive areas being designed to transmit light impressions from said image within said second spectral range.

33. Apparatus as claimed in claim 25, wherein said third means include optical filter means composed of repeatedly alternating first and second light-transmissive areas, with said first light-transmissive areas being designed to transmit light impressions from said image within said first spectral range, and said second light-transmissive areas being designed to transmit light impressions from said image within said further spectral range.

34. Apparatus as claimed in claim 25, including means for producing electrical signals indicative of a predetermined color content of said recorded image, said signal producing means comprising:

(a) fourth means responsive to said alternating first and second image areas recorded by said second means for producing a waveform composed of alternating first and second components, with said first components representing said light impressions within said first spectral range, and said second components representing said light impressions within said second spectral range;

(b) fifth means connected to said fourth means and responsive to said first and second components for producing a first signal substantially proportional to a first combination of said first and second components;

(c) sixth means connected to said fourth means and responsive to said first and second components for producing a second signal substantially proportional to a second combination of said first and second components;

(d) seventh means connected to said fifth and sixth means for combining said first and second signals in a first sense to provide a third signal proportional to said light impressions within said first range, and for combining said first and second signals in a second sense to provide a fourth signal proportional to said light impressions within said second range; and (e) eighth means responsive to said recorded light impressions within said further spectral range for producing a fifth signal proportional to said light impression within said further spectral range.

35. Apparatus as claimed in claim 28, including means for producing electrical signals indicative of a predetermined color content of said recorded image, said signal producing means comprising:

(a) third means responsive to said first image pattern recorded by said first means for producing a waveform composed of alternating first and second components, with said first components representing said light impressions in said first image pattern within said first spectral range, and said second components representing said light impressions within said second spectral range;

(b) fourth means connected to said third means and responsive to said first and second components for producing a first signal substantially proportional to a first combination of said first and second components;

(c) fifth means connected to said third means and responsive to said first and second components for producing a second signal substantially proportional to a second combination of said first and second components;

(d) sixth means connected to said fourth and fifth means for combining said first and second signals in a first sense to provide a third signal proportional to said light impressions in said first image pattern within said first range, and for combining said first and second signals in a second sense to provide a fourth signal proportional to said light impressions within said second range;

(e) seventh means responsive to said second image pattern recorded by said second means for producing a second waveform composed of alternating first and second components, with said first components of said second waveform representing said light impressions in said second image pattern within said first spectral range, and said second components of said second waveform representing said light impressions within said third spectral range;

(f) eighth means connected to said seventh means and responsive to said first and second components of said second waveform for producing a fifth signal substantially proportional to a second combination of said first and second components of said second waveform;

(g) ninth means connected to said seventh means and responsive to said first and second components of said second waveform for producing a sixth signal substantially proportional to a second combination of said first and second components of said second waveform;

(h) tenth means connected to said eighth and ninth means for combining said fifth and sixth signals in a first sense to provide a seventh signal proportional to said light impressions in said second image pattern within said first range, and for combining said fifth and sixth signals in a second sense to provide an eighth signal proportional to said light impressions within said third spectral range; and (i) eleventh means connected to said sixth means and said tenth means for combining said third and seventh signals to provide a ninth signal proportional to said light impressions in said first and second image patterns within said first spectral range.

36. Apparatus as claimed in claim 28, including means for producing electrical signals indicative of a predetermined color content of said recorded image, said signal producing means comprising:

(a) third means responsive to said first image pattern recorded by said first means for producing a first waveform composed of alternating first and second components, with said first components representing said light impressions in said first image pattern within said first spectral range, and said second components representing said light impressions within said second spectral range;

(b) fourth means responsive to said second image pattern recorded by said second means for producing a second waveform composed of alternating first and second components, with said first components of said second waveform representing said light impressions in said second image pattern within said first spectral range, and said second components of said second waveform representing said light impressions within said third spectral range;

(c) fifth means connected to said third means and responsive to said first and second components of said first waveform for producing a first signal proportional to the difference between said first and second components of said first waveform;

(d) sixth means connected to said fourth means and responsive to said first and second components of said second waveform for producing a second signal proportional to the difference between said first and second components of said second waveform; and (e) seventh means connected to said fifth and sixth means for producing a third signal proportional to said first components of said first and second waveforms.

37. Apparatus as claimed in claim 25, wherein said third means include:

(a) fourth means for resolving said image into a plurality of third image areas, and into a plurality of fourth image areas alternating with said third image areas, with said third image areas being composed of light impressions from said image substantially within said first spectral range, and said fourth image areas being composed of light impressions from said image substantially within said further spectral range; and (b) fifth means operatively associated with said fourth means for recording said alternating third and fourth image areas in a further image frame on said medium.

38. Apparatus as claimed in claim 37, wherein said further spectral range is included in said first spectral range.

39. Apparatus as claimed in claim 37, wherein said first spectral range and said further spectral range are so related that said light impressions within said first spectral range are of higher magnitude than said light impressions within said further spectral range.

40. Apparatus as claimed in claim 37, including means for producing electrical signals indicative of a predetermined color content of said recorded image, said signal producing means comprising:

(a) sixth means responsive to said alternating first and second image areas, recorded on said medium by said second means, for producing a waveform composed of alternating first and second components, with said first components representing said light impression within said first spectral range composing said first image areas, and said second components representing said light impressions within said second spectral range;

(b) seventh means connected to said sixth means and responsive to said first and second components for producing a first signal substantially proportional to a first combination of said first and second components;

(c) eighth means connected to said sixth means and responsive to said first and second components for producing a second signal substantially proportional to a second combination of said first and second components;

(d) ninth means connected to said seventh and eighth means for combining said first and second signals in a first sense to provide a third signal proportional to said light impressions within said first spectral range composing said first image areas, and for combining said first and second signals in a second sense to provide a fourth signal proportional to said light impressions within said second range;

(e) tenth means responsive to said alternating third and fourth image areas, recorded on said medium by said fifth means, for producing a second waveform composed of alternating first and second components, with said first components of said second waveform representing said light impressions within said first spectral range composing said third image areas, and said second components of said second waveform representing said light impressions within said further spectral range;

(f) eleventh means connected to said tenth means and responsive to said first and second components of said second waveform for producing a fifth signal substanially proportional to a first combination of said first and second components of said second waveform;

(g) twelfth means connected to said tenth means and responsive to said first and second components of said second waveform for producing a sixth signal substantially proportional to a second combination of said first and second components of said second waveform;

(h) thirteenth means connected to said eleventh and twelfth means for combining said fifth and sixth signals in first sense to provide a seventh signal proportional to said light impressions within said first range composing said third image areas, and for combining said fifth and sixth signals in a second sense to provide an eighth signal proportional to said light impressions within said further spectral range; and (i) fourteenth means connected to said ninth and thirteenth means for combining said third and seventh signals to provide a ninth signal proportional to said light impressions within said first spectral range composing said first and third image areas.

41. Apparatus as claimed in claim 37, including means for producing electrical signals indicative of a predetermined color content of said recorded image, said signal producing means comprising:

(a) sixth means responsive to said alternating first and second image areas, recorded on said medium by said second means, for producing a first waveform composed of alternating first and second components, with said first components representing said light impressions within said first spectral range composing said first image areas, and said second components representing said light impressions within said second spectral range;

(b) seventh means responsive to said alternating third and fourth image areas, recorded on said medium by said fifth means, for producing a second waveform composed of alternating first and second components, with said first components of said second waveform representing said light impressions within said first spectral range composing said third image areas, and said components of said second waveform representing said light impressions within said further spectral range;

(c) eighth means connected to said sixth means and responsive to said first and second components of said first waveform for producing a first signal proportional to the difference between said first and second components of said first waveform;

(d) ninth means connected to said seventh means and responsive to said first and second components of said second waveform for producing a second signal proportional to the difference between said first and second components of said second waveform; and (e) tenth means connected to said eighth and ninth means for producing a third signal proportional to said first components of said first and second waveforms.

References Cited

UNITED STATES PATENTS

| | | | |
|---|---|---|---|
| 2,907,817 | 10/1959 | Teer | 178—5.4 |
| 2,983,784 | 5/1961 | Razdow | 178—5.4 |
| 3,300,580 | 1/1967 | Takagi et al. | 178—5.4 |

RICHARD MURRAY, Primary Examiner

J. C. MARTIN, Assistant Examiner